(12) United States Patent
Köllensperger et al.

(10) Patent No.: US 10,193,482 B2
(45) Date of Patent: Jan. 29, 2019

(54) METHOD FOR REDUCING THE NOISE OF AN ELECTRIC MOTOR

(71) Applicant: Siemens Aktiengesellschaft, München (DE)

(72) Inventors: Peter Köllensperger, Nürnberg (DE); Ioannis Tsoumas, Zürich (CH)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/563,376

(22) PCT Filed: Feb. 9, 2016

(86) PCT No.: PCT/EP2016/052672
§ 371 (c)(1),
(2) Date: Sep. 29, 2017

(87) PCT Pub. No.: WO2016/155922
PCT Pub. Date: Oct. 6, 2016

(65) Prior Publication Data
US 2018/0091078 A1    Mar. 29, 2018

(30) Foreign Application Priority Data

Mar. 30, 2015 (DE) .................. 10 2015 205 691

(51) Int. Cl.
*H02P 6/10* (2006.01)
*H02P 21/05* (2006.01)
(Continued)

(52) U.S. Cl.
CPC .............. *H02P 21/05* (2013.01); *H02P 21/12* (2013.01); *H02P 27/08* (2013.01)

(58) Field of Classification Search
CPC ...... H02P 1/00; H02P 3/00; H02P 6/00; H02P 8/00; H02P 27/04; H02P 27/06;
(Continued)

(56) References Cited

U.S. PATENT DOCUMENTS 4,629,959 A * 12/1986 Okuyama ............. H02M 7/527
                                                           318/727
6,043,996 A    3/2000 Kumar
(Continued)

FOREIGN PATENT DOCUMENTS

CN      1492576 A       4/2004
DE      33 43 202 A1    6/1985
(Continued)

OTHER PUBLICATIONS

PCT International Search Report and Written Opinion of International Searching Authority dated Mar. 13, 2017 corresponding to PCT International Application No. PCT/EP2016/052672 filed Feb. 9, 2016.

*Primary Examiner* — Antony M Paul
(74) *Attorney, Agent, or Firm* — Henry M. Feiereisen LLC

(57) ABSTRACT

In a method for reducing noise of a motor fed by a converter, a magnetic flux in the motor is changed for reducing a fundamental oscillation and a harmonic oscillation of the magnetic flux, and a degree of control and/or a pulse frequency of the converter is changed so as to change a harmonic oscillation of the magnetic flux.

6 Claims, 3 Drawing Sheets

(51) Int. Cl.
*H02P 21/12* (2016.01)
*H02P 27/08* (2006.01)

(58) Field of Classification Search
CPC .... H02P 41/00; H02P 1/46; H02P 3/18; H02P 23/00; H02P 27/00; H02P 6/12; H02P 23/12; H02P 1/04; H02P 6/14; H02P 6/10; G05B 11/28
USPC ..... 318/400.01, 400.14, 599, 700, 701, 721, 318/727, 799, 800, 801, 811, 430, 432, 318/400.23, 400.24; 363/21.1, 40, 44, 95, 363/174
See application file for complete search history.

(56) References Cited

U.S. PATENT DOCUMENTS

| | | | |
|---|---|---|---|
| 7,151,354 B2* | 12/2006 | Yoshinaga | H02J 3/01 318/611 |
| 7,176,652 B2* | 2/2007 | Wakabayashi | H02P 29/50 318/400.02 |
| 8,674,647 B2* | 3/2014 | Iwaji | B60L 15/025 318/400.01 |
| 8,816,616 B2 | 8/2014 | Costanzo et al. | |
| 8,860,356 B2* | 10/2014 | Yuuki | B60L 15/025 318/432 |
| 9,401,673 B2* | 7/2016 | Semura | H02P 6/10 |
| 2002/0175644 A1 | 11/2002 | Su | |
| 2004/0062062 A1 | 4/2004 | Lee et al. | |
| 2008/0018190 A1 | 1/2008 | Takahata et al. | |
| 2008/0136380 A1 | 6/2008 | Hoffmann et al. | |
| 2009/0108780 A1 | 4/2009 | Schulz et al. | |
| 2010/0052583 A1 | 3/2010 | Takamatsu et al. | |
| 2014/0084829 A1 | 3/2014 | Sung et al. | |

FOREIGN PATENT DOCUMENTS

| | | |
|---|---|---|
| DE | 102 54 940 A1 | 6/2004 |
| DE | 103 36 068 A1 | 3/2005 |
| DE | 10 2008 052 921 A1 | 7/2009 |
| DE | 10 2010 009 056 A1 | 8/2011 |
| DE | 10 2010 049 169 A1 | 4/2012 |
| EP | 2 684 623 A1 | 1/2014 |
| EP | 2704306 A2 | 3/2014 |
| JP | H04200294 A | 7/1992 |
| JP | 2007-020246 A | 1/2007 |
| RU | 2094941 C1 | 10/1997 |
| RU | 2234184 C1 | 8/2004 |
| RU | 2464621 C1 | 10/2012 |

\* cited by examiner

METHOD FOR REDUCING THE NOISE OF AN ELECTRIC MOTOR

CROSS-REFERENCES TO RELATED APPLICATIONS

This application is the U.S. National Stage of International Application No. PCT/EP2016/052672, filed Feb. 9, 2016, which designated the United States and has been published as International Publication No. WO 2016/155922 and which claims the priority of German Patent Application, Serial No. 10 2015 205 691.0, filed Mar. 30, 2015, pursuant to 35 U.S.C. 119(a)-(d).

BACKGROUND OF THE INVENTION

The invention relates to a method for reducing the noise of a motor fed by a converter. The invention further relates to a regulation device for reducing such noise of a motor fed by a converter and a propulsion system with such a regulation device, a converter and a motor.

A significant proportion of the noise radiated by motors is of electromagnetic origin. Radial force waves in motors are generated by harmonic waves of the magnetic flux inside the motor which arise as a result of the non-sinusoidal distribution of the stator and rotor winding and as a result of the fluctuations of the air gap due to the stator and rotor splines.

The radial force waves excite the laminated core. Oscillations arise which are transmitted as structure-borne noise and spread over the surrounding housing as noise. The housing acts as a transmission element and boosts the level of radiated noise in the range of its natural frequencies.

To reduce the motor noise, attempts are customarily made to either change or optimize the mechanical design of the motor or to minimize time harmonics due to the converter by means of the modulation method, and to avoid time harmonics due to the converter with frequencies in the region of resonance points of the motor.

SUMMARY OF THE INVENTION

The object of the invention is to further reduce the motor noise from motors fed by converters.

This object is achieved by a method for reducing the noise of a motor fed by a converter, wherein depending on a load torque on the motor, the magnetic flux in the motor is changed such that the product of fundamental oscillation of the magnetic flux and a harmonic oscillation of the magnetic flux is reduced.

This object is further achieved by a regulation device for reducing the noise of a motor fed by a converter by means of a method for reducing the noise of a motor fed by a converter, wherein the regulation device can be connected to the converter such that a set point for the magnetic flux of the motor can be transmitted. The object is further achieved by a propulsion system comprising such a regulation device, a converter and a motor.

Advantageous embodiments of the invention are specified in the dependent claims.

The invention is based on the discovery that for variable-speed drives which are fed by converters, in addition to the aforementioned radial force waves, additional force waves arise. The radial force waves which give rise to noise generation are produced by the interaction of the fundamental oscillation of the magnetic flux with its time harmonics. Decisive for the noise generation of a motor during converter operation is the product of the fundamental oscillation of the magnetic flux and the harmonic oscillation(s) of the magnetic flux. The latter depend(s) on parameters produced by converter modulation such as, for example, the type of modulation (pulse pattern), the duty cycle and the pulse frequency.

To be able to theoretically explain the generation of radial force waves due to the converter more precisely, the simplified case is assumed that the fundamental oscillation and two harmonic oscillations are present to generate the magnetic flux in the stator voltage. In this case, the space vector of the stator voltage is described by the following equation $$\vec{u} = \vec{u}_1 + \vec{u}_{h1} + \vec{u}_{h2} = U_1 \cdot e^{j(\omega_1 t + \varphi_1)} + U_{h1} \cdot e^{j(\omega_{h1} t + \varphi_{h1})} + U_{h2} \cdot e^{-j(\omega_{h2} t + \varphi_{h2})}.$$

The magnetic flux density in the air gap of an asynchronous motor can be shown as a rotating vector. Assuming the stator voltage is off, the magnetic flux density is $$\vec{B} = \vec{B}_1 + \vec{B}_{h1} + \vec{B}_{h2} = -j_{B1} \cdot e^{j(\omega_1 t + \varphi_1)} - jB_{h1} \cdot e^{j(\omega_{h1} t + \varphi_{h1})} + jB_{h2} \cdot e^{-j(\omega_{h2} t + \varphi_{h2})}$$

with $$B_1 \sim \frac{U_1}{\omega_1} \text{ and } B_{h1,2} \sim \frac{U_{h1,2}}{\omega_{h1,2}}.$$

The projection of the rotating phasor $\vec{B}$ onto the axis in situ $p\varphi_x$ produces the magnetic induction distribution $B(t,\varphi_x)$ along the air gap of the machine:

$$B(t,\varphi_x) = Re[\vec{B} \cdot e^{-jp\varphi_x}] = B_1 \cdot \sin[\omega_1 t + \varphi_1 - p\varphi_x] + B_{h1} \cdot \sin[\omega_{h1} t + \varphi_{h1} - p\varphi_x] + B_{h2} \cdot \sin[\omega_{h2} t + \varphi_{h2} + p\varphi_x].$$

The radial tensile stress (radial traction per unit of area) in the air gap is proportional to the square of the magnetic flux $$\sigma(t, \varphi_x) = \frac{B^2(t, \varphi_x)}{2\mu_0}.$$

Assuming that the amplitude of the harmonic oscillations is much smaller than the fundamental oscillation amplitude, this equation produces $$\sigma(t, \varphi_x) \approx \frac{B_1^2(t, \varphi_x)}{2\mu_0} + \frac{B_1(t, \varphi_x)}{\mu_0} \cdot (B_{h1}(t, \varphi_x) + B_{h2}(t, \varphi_x)).$$

which with the aid of the aforementioned relationships produces the following:

$$\sigma(t, \varphi_x) = \frac{B_1^2}{2l_0}[1 - \cos(2\omega_1 t + 2\varphi_1 - 2p\varphi_x)] + \\ + \frac{B_1 B_{h1}}{\mu_0}\begin{pmatrix}\cos[(\omega_{h1} - \omega_1)t + \varphi_{h1} - \varphi_1] - \\ \cos[(\omega_{h1} + \omega_1)t + \varphi_{h1} + \varphi_1 - 2p\varphi_x]\end{pmatrix} + \\ + \frac{B_1 B_{h2}}{\mu_0}\begin{pmatrix}\cos[(\omega_{h2} - \omega_1)t + \varphi_{h2} - \varphi_1 + 2p\varphi_x] - \\ \cos[(\omega_{h2} + \omega_1)t + \varphi_{h2} + \varphi_1]\end{pmatrix}.$$

This equation shows the presence of two pulsating components with the frequencies $\omega_{h1} - \omega_1$, $\omega_{h2} + \omega_1$ and two rotating components with the frequencies $\omega_{h1} + \omega_1$, $\omega_{h2} - \omega_1$. The spatial arrangement of the rotating components is equal to 2p, with p as the pole pair number. As can be seen in this equation, the amplitude of this component can be reduced by reducing the amplitudes of the harmonic oscillations $B_{h1}$ and $B_{h2}$ or the amplitude of the fundamental harmonic $B_1$.

A change in the fundamental oscillation of the magnetic flux is produced by a change in the flux-forming current. The flux-forming current is a reactive current. The fundamental oscillation of the magnetic flux can also be approximated by the ratio of motor voltage to motor frequency.

A change in the harmonic oscillations of the magnetic flux in the motor can be brought about by an altered duty cycle, also described as a degree of modulation. This altered duty cycle can be selected such that it produces lower harmonic oscillations in the magnetic flux of the motor. It has been shown that this effect can be used to reduce the product of fundamental oscillation and harmonic oscillation of the magnetic flux in the motor such that the noise of a motor fed by a converter is reduced. Another option for reducing harmonic oscillations of the magnetic flux and the resulting noise is to change the pulse frequency.

The noise which is generated by the motor can therefore be reduced by a change of the magnetic flux in the motor. Thus, for example, a reduction in the fundamental oscillation of the flux in partial-load operation can result in the product of fundamental oscillation and harmonic oscillation or harmonic oscillations of the magnetic flux assuming a smaller value and the noise of the motor being consequently reduced. Hitherto the reduction of the fundamental oscillation of the flux was only used to reduce motor losses in partial-load operation. In contrast to a reduction in power loss, besides lowering the flux, an increase in the magnetic flux and the associated increase in the duty cycle can lead to noise reduction depending on the operating point of the motor and/or converter. The increase of the flux is possible in particular if the motor has corresponding design reserves such that the iron does not go into saturation when the magnetic flux is increased. Furthermore, the pulse frequency can be increased for noise reduction when a flux increase reduces the motor current.

Converters which have an intermediate circuit and initially convert an input voltage into a direct current in the intermediate circuit before this is again converted into an alternating voltage to supply the motor can be used as converters here. Likewise, direct converters are also suitable for the application of the method according to the invention, in which no direct current is generated.

The method according to the invention can be performed for all kinds of motors fed by converters, in particular for asynchronous machines and synchronous machines.

In an advantageous embodiment of the invention the magnetic flux in the motor is changed depending on a load torque on the motor. It has proved particularly advantageous for the method to change the magnetic flux when the motor and/or converter is below its maximum performance. This state is also described as partial-load operation. The resulting degrees of freedom such as, for example, thermal reserves, can then be used for noise reduction and do not necessarily increase the total losses of the motor and/or converter. However, an increase in losses in the converter and/or motor can be tolerated in favor of lower noise emission.

In an advantageous embodiment of the invention, the load torque is ascertained from output currents of the converter. As these variables and the mathematical model of the motor are known to the converter regulator, these can also easily be used to reduce the motor noise. To this end, the reduction of the motor noise by changing the flux is undertaken by the converter regulator itself. As the necessary values of the converter output currents are known to the converter regulator, the change in flux can also be easily undertaken. Additional variables which describe the state of the converter can also be advantageously included for the regulator.

Alternatively, the change in the flux can also be prescribed by a separate regulation device. Corresponding values such as, for example, the converter output currents and/or reference flux values, are then transmitted between the converter regulator and the separate regulation device.

In an advantageous embodiment of the invention, depending on the rotational speed of the motor the magnetic flux is changed by means of the voltage and/or the current on the motor. The rotational speed can be ascertained by the motor by means of a suitable measuring device such as, for example, a velocity generator. Likewise, it is possible to extrapolate the rotational speed of the motor from variables which are known to the converter and its converter regulator such as, for example, the output voltage or the output current. In a simple case, this can be done from the frequency of one of these variables. In the case of an asynchronous machine, this frequency distinguishes itself from the motor speed by means of the slip. For the performance of the method, however, it has been shown that the value of the frequency is already sufficiently precise. Alternatively, the rotational speed of the motor can be calculated from the variables of the converter regulator and a corresponding motor model.

With a known load characteristic with which the torque on the motor shaft essentially depends on the rotational speed, the ascertainment of the load torque of the motor can be omitted. The load ratios and thus also the operating status of the motor and/or converter can be determined from a rotational speed signal with sufficient precision to enable corresponding measures to be taken to change the flux without operating the motor in inadmissible operating conditions such as, for example, overload or saturation.

In an advantageous embodiment of the invention, the load torque is ascertained by means of a characteristic curve as a function of the rotational speed of the motor. Special load machines such as pumps or compressors have a particular characteristic which can be specified in the form of a characteristic curve. The load torque of the motor can be precisely determined with the aid of this characteristic curve and the corresponding motor or load speed. The operating status of the motor and/or converter can be ascertained from this so as to undertake a corresponding flux change for noise reduction.

The characteristic curve can be ascertained offline and stored in a regulation facility. Alternatively or additionally, the characteristic curve can also be determined during operation of the motor and if necessary stored.

In an advantageous embodiment of the invention the pulse frequency of the converter is changed. In the partial-load range the residual performance of the converter can be used to increase the pulse frequency. Admittedly, this measure produces more losses in the converter. However, these can be used with the residual performance of the converter, for example, in the partial-load range or by means of a correspondingly larger design of the converter, for an increase in the pulse frequency. In addition, during full-load operation, for example, a flux increase can also be undertaken, provided that the motor does not go into saturation as a result. The associated reduction in the motor currents can be used to increase the pulse frequency. This is reflected in a reduction of the harmonic oscillations of the magnetic flux such that the resulting noise is also reduced. As the residual performance also depends on the load torque of the motor, among other things, it has proved favorable to also increase the pulse frequency as a function of the load torque of the motor.

A higher pulse frequency brings about a better approximation of the currents in a sinusoidal time progression. As a result, harmonic oscillations in the current and thus in the magnetic flux of the motor can be reduced. The associated higher losses of the converter can be tolerated in favor of the lower noise of the motor.

In an advantageous embodiment of the invention the intermediate circuit voltage of the converter is changed. The ratio between the output voltage of the converter and the intermediate circuit voltage is described as the duty cycle of the converter. Depending on the duty cycle and the pulse frequency, different levels of harmonic oscillation are generated in the output voltage and therefore also in the output current which produces the magnetic flux in the motor. By changing the intermediate circuit voltage, both an increase and a reduction, with the same output voltage of the converter the duty cycle is changed. Through an appropriate change in the intermediate circuit voltage, a duty cycle can therefore be set by the converter or its converter regulator which only produces a low level of harmonic oscillations. This duty cycle therefore contributes to reduction of the noise of the motor.

BRIEF DESCRIPTION OF THE DRAWING

The invention is explained in more detail hereinafter with reference to the exemplary embodiments shown in the figures, in which.

DETAILED DESCRIPTION OF PREFERRED EMBODIMENTS

Figure 1:
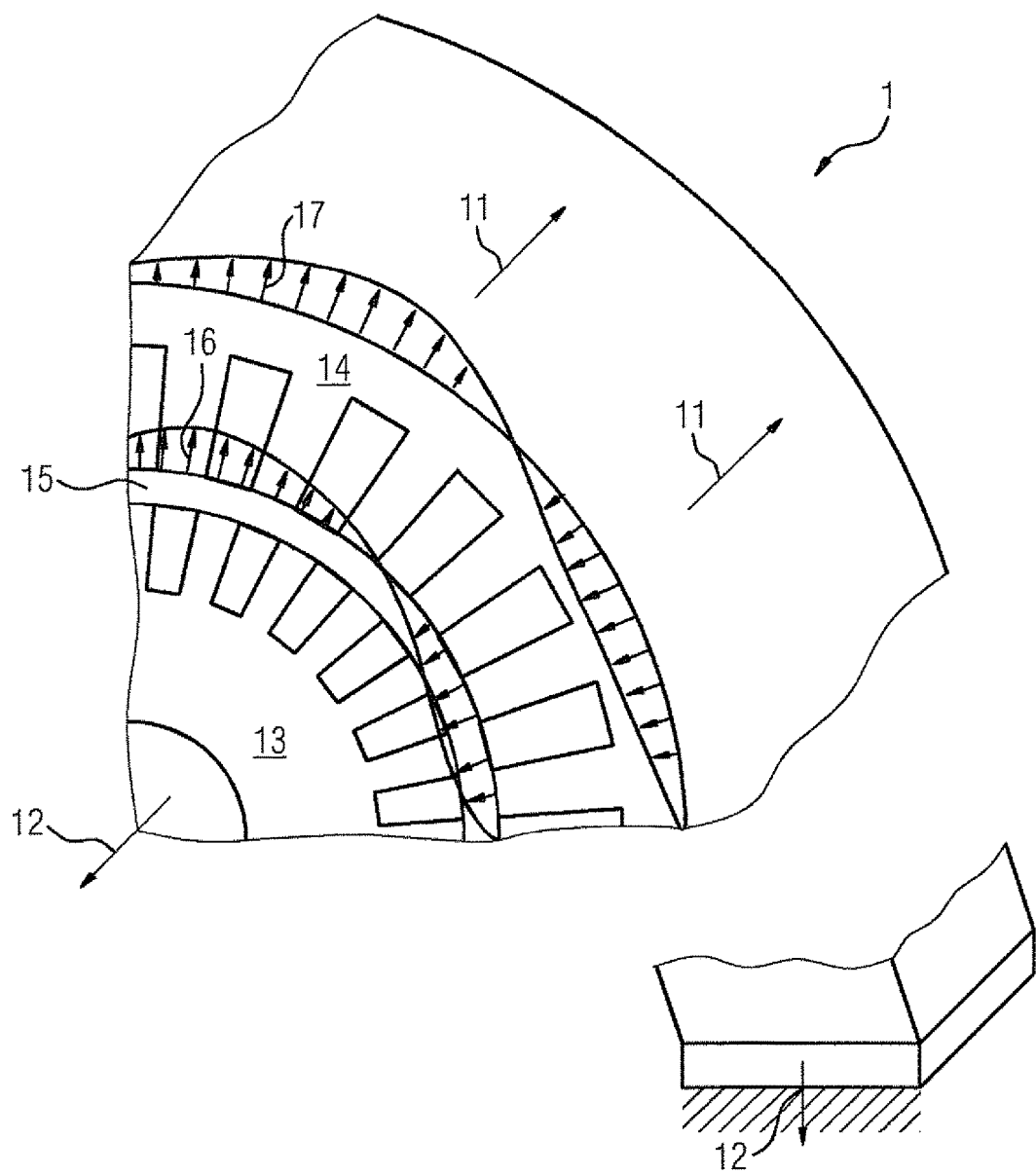
FIG. 1 shows a cross section through a motor.

FIG. 1 shows cutouts of a cross section through the motor 1. The motor 1 has a stator 14 and a rotor 13. The air gap 15 is located between the stator 14 and the rotor 13. The radial traction 16 is shown with its fundamental oscillation and its harmonic oscillations in the form of arrows in this figure. This distribution of the radial traction 16 over the circumference produces a radial deformation 17 of the stator 14. The temporal variation of the radial traction 16 in the motor 1 produces a temporal change in the radial deformation 17. The radial deformation 17 thus results in vibration of the motor housing such that both airborne sound 11 and structure-borne noise 12 occur and may be perceived as noise. The radial deformation 17 passes from the core of the stator 14 to the housing of the motor 1 and there spreads as airborne sound 11 via the air. If there is no housing, the radial deformation 17 passes directly into the air from the stator core as airborne sound 11. The structure-borne noise 12 is firstly transmitted by way of the mounting of the motor 1 as well as by way of the motor shaft.

Figure 2:
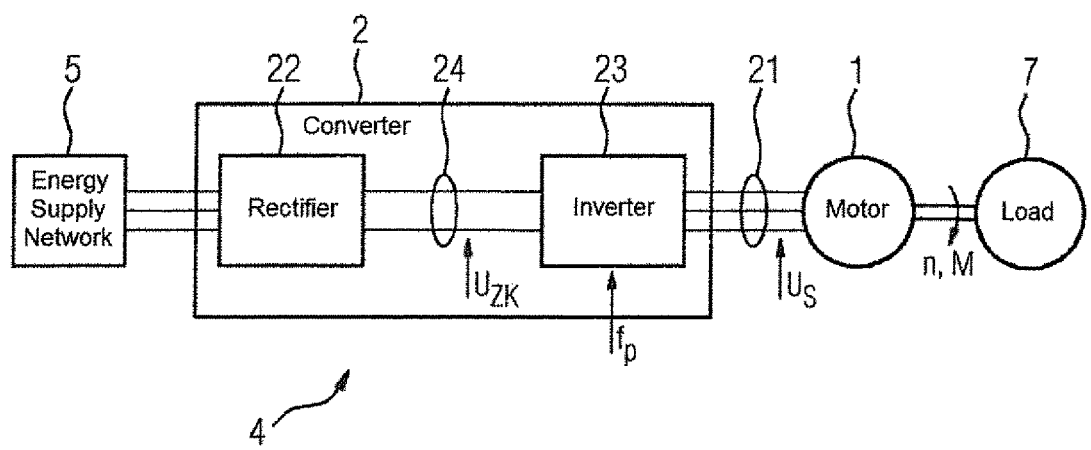
FIG. 2 shows the structure of a propulsion system.

FIG. 2 shows the structure of a propulsion system 4. This propulsion system 4 has an energy supply network 5, a converter 2, a motor 1 and a load 7 connected to the motor 1. The converter 2 is triphasically connected to an energy supply network 5. The motor 1 is triphasically connected to the output of the converter 2. The load 7 is connected to the motor 1 by way of the motor shaft. The converter 2 has a rectifier 22 and an inverter 23. The rectifier 22 and the inverter 23 are interconnected by way of the intermediate circuit 24. The rectifier 22 has the task of converting the alternating voltage of the energy supply network 5 into a direct current. From this direct current a voltage $U_s$ is generated by the inverter 23 at the output of the converter 2. Alternatively, and not shown in this exemplary embodiment, the conversion of the voltage of the energy supply network directly into the output voltage of the converter can also be undertaken without using an intermediate circuit. This kind of converter is called a direct converter. The method according to the invention is also applicable to this. With the aid of the amplitude and the frequency of the voltage Us, the desired operating point is set on the motor 1, A corresponding converter regulator 25, which sets the operating point and corrects deviations, is not shown in FIG. 2 for the sake of clarity. A further characteristic variable for the converter 2, in particular the inverter 23, is the pulse frequency $f_p$ with which the inverter 23 switches its switch not explicitly shown in this figure, for example using a pulse width modulation, to produce the corresponding voltage $U_s$ at the output of the converter 2. Output currents 21 of the converter 2 which produce both the magnetic flux t and the torque M in the motor 1 are generated by the voltage $U_s$. This torque M is transmitted to the load 7 by way of a shaft. The aim of a converter regulator 25 not shown in more detail here is, for example, to regulate the rotational speed n and torque M of the motor 1 to obtain a stable operating point.

Figure 3:
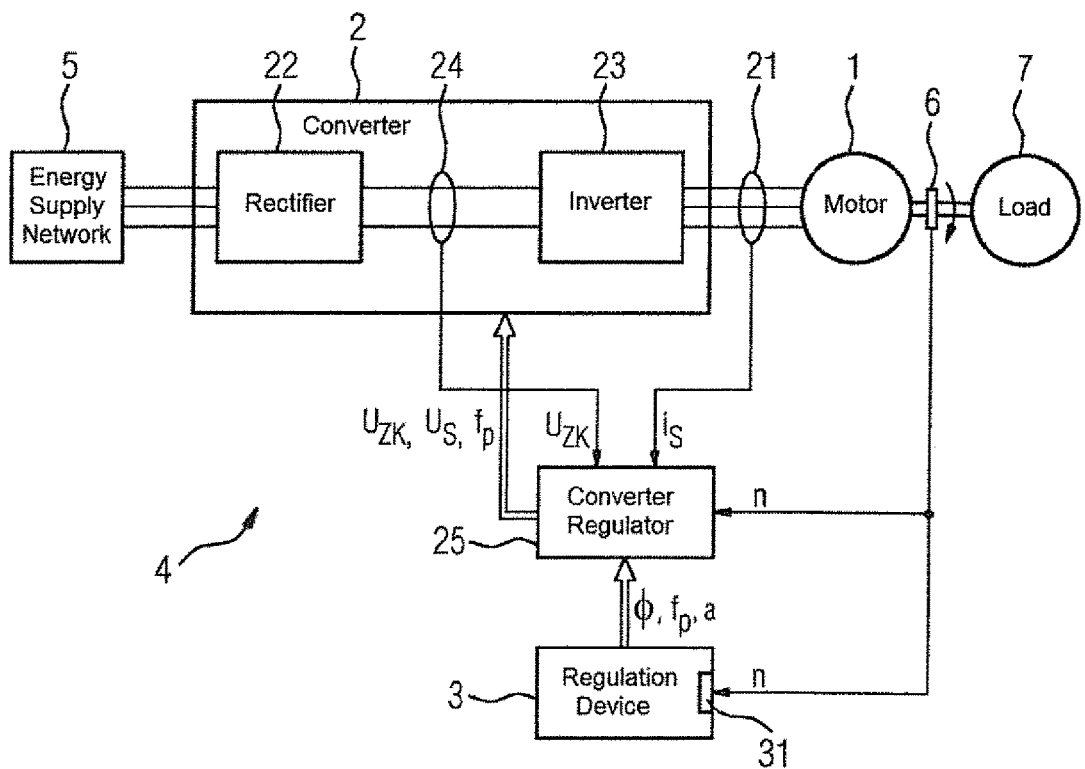
FIG. 3 shows the structure of a propulsion system with regulator

FIG. 3 shows the structure of a propulsion system 4 including a converter regulator 25 and a regulation device 3 for changing the magnetic flux φ and/or the pulse frequency $f_p$ and/or the intermediate circuit voltage $U_{ZK}$. To avoid repetition, please refer to the description of FIG. 2 and the reference characters established there. In addition to the components which are shown in FIG. 2, the propulsion system 4 of FIG. 3 has a means 6 of detecting the rotational speed n. The signal for the rotational speed n is transmitted by the means 6 for detecting the rotational speed n to the converter regulator 25 and to the input 31 of the regulation device 3.

The regulation device 3 can be arranged both in the converter 2 as well as outside the converter 2. The regulation device 3 can also be arranged in the converter 2 or outside the converter 2. Furthermore, the regulation device 3 can also be integrated in the converter regulator 25 and thus represent part of the converter regulator 25. The task of the converter regulator 25 is to generate a set point for the output voltage of the converter 2. In particular, variables like the intermediate circuit voltage $U_{ZK}$, the output currents of the converter 21 $i_s$ and the rotational speed n of the converter can be used for this purpose. Furthermore, the regulation device 3 serves to reduce the noise produced by the motor 1. To this end, the set point of the magnetic flux φ as a function of the rotational speed n is changed such that the noise of the motor 1 is reduced. As aforementioned, this is undertaken by the magnetic flux φ being adjusted such that the fundamental oscillation of the magnetic flux multiplied by the harmonic oscillations of the magnetic flux φ assume as low a value as possible. Furthermore, the pulse frequency $f_p$ and the intermediate circuit voltage $U_{ZK}$ can be changed such that these also reduce the aforementioned product of fundamental oscillation and harmonic oscillation of the magnetic flux. To this end, corresponding set points of the regulation device 3 are transmitted to the converter regulator 25. The converter regulator 25 can then set the corresponding operating point with changed magnetic flux φ and if necessary, with changed pulse frequency $f_p$ by accessing the switching operations of the switch (power semiconductor) of the inverter 23. By accessing the switching operations of the rectifier 22, a changed intermediate circuit voltage $U_{ZK}$ can be set. A change in the magnetic flux φ, the pulse frequency $f_p$ and the intermediate circuit voltage $U_{ZK}$ can therefore be undertaken by the converter 2. This possibility of intervention changes the corresponding physical variables in the motor 1 and the converter 2.

Figure 4:
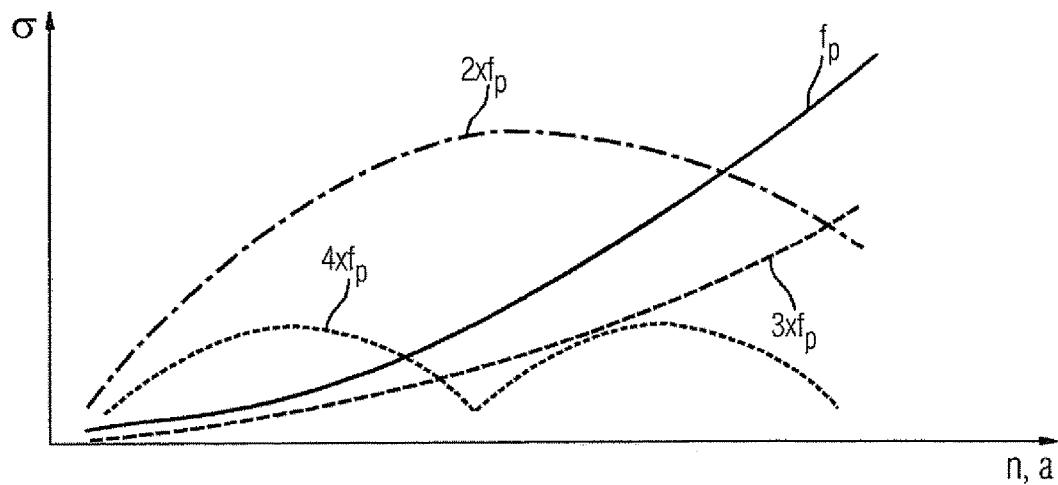
FIG. 4 shows the dependence of the harmonic oscillations of the radial traction 6 in various frequency ranges (multiplicity of the pulse frequency) on the duty cycle a for a typical modulation method (space vector modulation)

FIG. 4 shows the relationship between the harmonic oscillations of radial traction 6 in various frequency ranges (multiples of the pulse frequency) from the duty cycle a for a customary modulation method (space vector modulation). They are proportional to each other, at least until the rated speed, duty cycle a and rotational speed n. Above the rated speed, field weakening then begins. It is recognized that, depending on the duty cycle, various harmonic oscillations in the multiples of the pulse frequency are strengthened or weakened. Frequency ranges exist here in which an increase in the duty cycle (by, for example, reducing the intermediate circuit voltage) brings about a reduction in the harmonic oscillations of the radial traction 6 (e.g. for the harmonic oscillations at double the pulse frequency). If, for example, the motor 1 is sensitive in the range of the double pulse frequency, the duty cycle a should be increased to bring about noise reduction. If the motor is sensitive in the range of the single pulse frequency, the duty cycle a should be kept as low as possible. This is also accompanied by a reduction in the noise generation of the motor 1.

Figure 5:
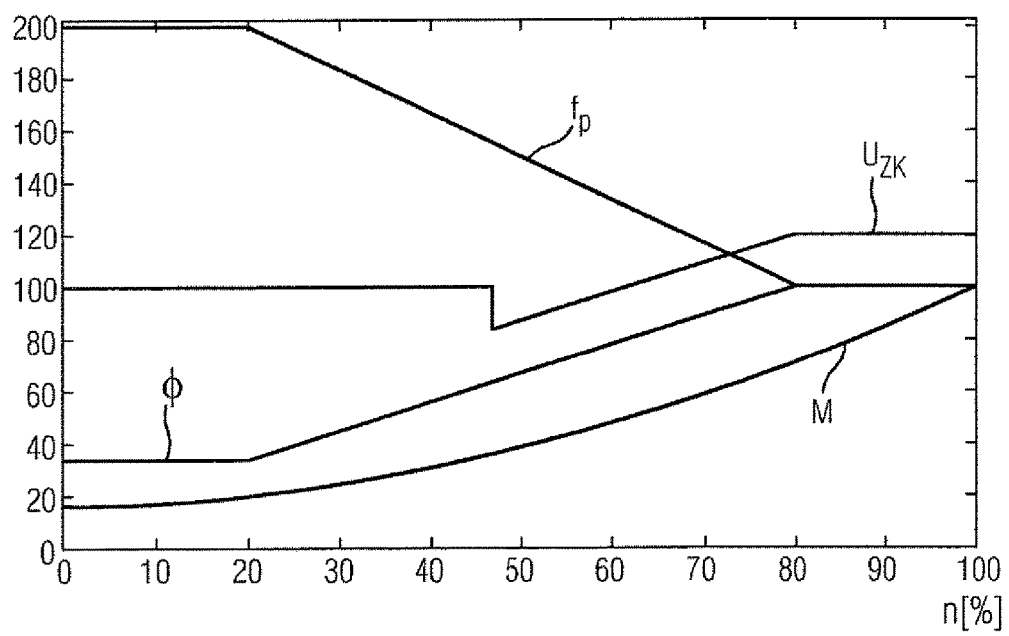
FIG. 5 shows an exemplary embodiment for changing magnetic flux, pulse frequency and intermediate circuit voltage as a function of the motor speed.

FIG. 5 shows an exemplary embodiment of the method for reducing the noise of a motor 1. In this application, the load torque M is known as a function of the rotational speed n. Due to the relatively low torque M at low rotational speeds n, the flux φ is reduced at low rotational speeds. It only achieves its 100% value at high rotational speeds. The lower current associated with the low magnetic flux φ furthermore provides the opportunity to increase the pulse frequency $f_p$ without overloading, in particular thermally overloading, the converter 2. In the exemplary embodiment, the pulse frequency is 200% at low rotational speeds. With increasing load and therefore also higher losses, both in the converter 2 and the motor 1, the pulse frequency $f_p$ is again reduced. At maximum rotation speed, at which the maximum torque M must also be supplied by the motor, both the magnetic flux φ and the pulse frequency $f_p$ are at the nominal value of 100%. Furthermore, as shown here in this exemplary embodiment, the intermediate circuit voltage $U_{ZK}$ can also be adjusted by way of the rotational speed n to achieve a noise reduction of the motor 1.

Although the invention was illustrated and described in more detail by the preferred exemplary embodiments, the invention is not limited by the disclosed examples and other variations may be derived therefrom by a person skilled in the art without departing from the scope of the invention.

What is claimed is:

1. A method for reducing noise of a motor fed by a converter, said method comprising:
    changing a magnetic flux in the motor for reducing a fundamental oscillation and a harmonic oscillation of the magnetic flux; and
    changing a duty cycle and/or a pulse frequency of the converter so as to change a harmonic oscillation of the magnetic flux, wherein the magnetic flux in the motor is changed as a function of a load torque on the motor.

2. The method of claim 1, further comprising determining the load torque from an output current of the converter.

3. The method of claim 2, wherein the magnetic flux in the motor is changed as a function of a rotational speed of the motor in response to a voltage and/or a current supplied to the motor.

4. The method of claim 3, wherein the load torque is determined by a characteristic curve as a function of the rotational speed of the motor.

5. The method of claim 3, further comprising changing an intermediate circuit voltage of the converter.

6. The method of claim 1, further comprising increasing the control to increase the magnetic flux.

* * * * *